United States Patent
Ruben

[11] 3,944,337
[45] Mar. 16, 1976

[54] THREE ELEMENT OBJECTIVE LENS WITH ELLIPSOIDAL, HYPERBOLIC, AND PARABOLIC SURFACES

[75] Inventor: Paul Lewis Ruben, Penfield, N.Y.
[73] Assignee: Eastman Kodak Company, Rochester, N.Y.
[22] Filed: Oct. 18, 1974
[21] Appl. No.: 516,235

[52] U.S. Cl. ................ 350/189; 350/192; 350/226
[51] Int. Cl.² .. B29D 13/18; G02B 3/04; G02B 9/14
[58] Field of Search.................... 350/226, 189, 192

[56] References Cited
UNITED STATES PATENTS

| | | | |
|---|---|---|---|
| 1,507,212 | 9/1924 | Silberstein | 350/189 |
| 2,530,397 | 11/1950 | Merté | 350/189 |
| 3,194,139 | 7/1965 | Babcock | 350/189 X |
| 3,443,863 | 5/1969 | Ruben | 350/226 |
| 3,762,801 | 10/1973 | Baker | 350/189 |

Primary Examiner—John K. Corbin
Assistant Examiner—Conrad Clark
Attorney, Agent, or Firm—J. Morrow

[57] ABSTRACT

An objective lens comprising three elements, a front positive biconvex element, a middle negative biconcave element and a rear positive biconvex element. The first two elements are made of inexpensive plastic materials. Aberration correction at a high relative aperture is improved by the use of aspheres on selected surfaces of the first and second elements.

6 Claims, 1 Drawing Figure

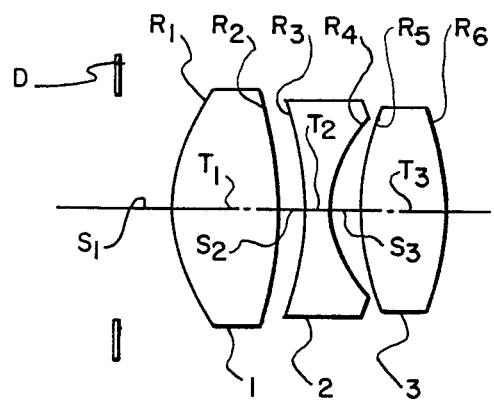

THREE ELEMENT OBJECTIVE LENS WITH ELLIPSOIDAL, HYPERBOLIC, AND PARABOLIC SURFACES

BACKGROUND OF THE INVENTION

1. Field of the Invention

This invention relates to photographic objective lenses and in particular to such lenses that comprise three air spaced elements.

2. Description of the Prior Art

Triplet lenses for use in photographic apparatus are well known and have been used for many years. Moreover, high relative aperture lenses have also been in use for many years in the photographic industry. However, with the advent of available light photography, the use of high relative aperture lenses has spread to photographic apparatus designed to be mass produced for the amateur market. The price of such lenses then becomes of great concern and the relatively complex, well corrected, high relative aperture lenses known in the art are too costly.

The introduction of plastic elements in triplet lensens has been generally adopted in order to decrease the cost of such lenses. However, the introduction of plastic elements has usually resulted in accentuation of certain design problems. For instance, variation in the back focus length due to thermally induced contraction and expansion of the optics may be increased.

SUMMARY OF THE INVENTION

In accordance with the present invention, there is provided a three element objective which comprises a front positive biconvex element, a middle biconcave negative element and a rear positive biconvex element. Aspheres are incorporated on selected surfaces of the first and second elements to provide improved aberration correction at a high relative aperture. In the preferred embodiments, the first two elements may be made of polymethyl methacrylate, polycyclohexyl methacrylate, polystyrene, or acrylonitrile.

DESCRIPTION OF THE DRAWING

In the description of the preferred embodiments of the invention presented below, reference is made to the accompanying drawing which is a schematic axial cross-section of a three element objective according to the present invention.

DESCRIPTION OF THE PREFERRED EMBODIMENTS

For all purposes of describing or claiming of the invention, the term lens will be used to describe the complete lens and not the elements thereof. In the drawing, the elements are numbered from left to right with Arabic numerals. In each of the examples, the elements, indices of refraction N, Abbe numbers V, radii of curvature R, thicknesses T, and air spaces S are numbered to correspond with the drawing. The indices of refraction are for the 0.5893 micron sodium D lines of the spectrum. The Abbe numbers are calculated utilizing the D line index and, as the main dispersion, the index difference between the 0.4861 micron hydrogen F line and the 0.6563 micron hydrogen C line. Radii of curvature having centers of curvature to the right of the surface are considered positive; those with centers of curvature to the left of the surface are considered negative.

In all embodiments of the invention as illustrated in the drawing, the lens comprises three air spaced elements. Element 1 is a front positive biconvex element. Element 2 is a middle negative biconcave element. Element 3 is a rear positive biconvex element. D is a diaphragm.

The use of aspheric surfaces in a lens design provides additional parameters for correction of aberrations. Incorporation of an aspheric surface is particularly useful in a lens of large relative aperture, because the aspheric surfaces may be utilized to improve optical performance by controlling higher order spherical aberrations throughout the image field. Moreover, the choice of aspheric surfaces may preclude the necessity of increasing the strength of spherical surfaces to permit a reduction in the number of elements, thereby making the lens more manufacturable. In the design of the present invention, the improved aberration correction and the high relative aperture are achieved by the use of aspheres on one or more of the first four surfaces of the lens.

An aspheric surface may be described by the following equation:

$$x = \frac{Cy^2}{1+\sqrt{1-(1+K)C^2y^2}}$$

This equation describes a surface in terms of its surface sag $x$ at a semi-aperture distance $y$ from the axis of the lens. The constant $C$ is the vertex curvature, that is, the surface curvature at the vertex of the lens, and is equal to the reciprocal of the vertex radius of curvature $R$. The constant $K$ is the conic constant and is defined by the equation $K = -e^2$ where $e$ is the eccentricity of the surface. Certain values of $K$ describe conic sections or surfaces of revolution about the optical axis of the lens. Terms higher than the quadratic in the equation for $x$ may also be included, if desired.

Lenses may be made according to this invention by following the specifications in the preferred embodiments presented below:

EXAMPLE I

| Element | $N_D$ | V | Radius mm | Thickness or Separation mm |
|---|---|---|---|---|
| 1 | 1.49168 | 57.4 | $R_1$=Asphere | $S_1$=1.800 |
|  |  |  | $R_2$=Asphere | $T_1$=3.500 |
|  |  |  |  | $S_2$=0.814 |
| 2 | 1.59028 | 30.9 | $R_3$=Asphere | $T_2$=0.900 |
|  |  |  | $R_4$=Asphere | $S_3$=0.975 |
| 3 | 1.73400 | 51.0 | $R_5$= 9.0058 | $T_3$=2.800 |
|  |  |  | $R_6$=−9.0058 |  |

Example I represents a significant improvement in the relative aperture and field coverage for a triplet. The relative aperture is $f/1.57$ with a focal length of 11.75mm and a semi-field angle of 16.94°. It may be seen that aspheres are utilized on the first four surfaces of the lens with the surfaces being respectively an ellipsoid, a hyperboloid, and two paraboloids on the middle negative element. However, the specific choice of the asphere for a particular surface is not absolutely essential, with the placing of paraboloids on the first element or other conic sections on the second element also resulting in comparable optical quality. Element 1 is formed of polymethyl methacrylate while Element 2 is formed of polystyrene. The respective power and spacing of these two elements is chosen to minimize variations in back focal length for the lens caused by ambient thermal fluctuations, while aberration correction is improved by the selection of the conic surfaces on these two elements plus the distribution of the power of each element between its two surfaces. The rear element is formed of a relatively high index glass to provide assistance in achieving a flat field. Element 3 has also been made a symmetric biconvex element in order to simplify assembly of the lens, since it is impossible to assemble this element in an improper orientation. The aspheric surfaces in this design are simple conics without any higher order corrections and the coefficients for each of the surfaces are as tabulated below:

Table I

| Surf. 1 | Surf. 2 | Surf. 3 | Surf. 4 |
| --- | --- | --- | --- |
| C 0.15632779 | −0.07215136 | −0.08858961 | 0.23514772 |
| K −0.84927155 | −17.36321211 | −1.0 | −1.0 |

EXAMPLE II

| Element | $N_D$ | V | Radius mm | Thickness or Separation mm |
| --- | --- | --- | --- | --- |
| 1 | 1.49168 | 57.4 | $R_1$=Asphere | $S_1$=1.800 |
|   |   |   | $R_2$=Asphere | $T_1$=3.700 |
|   |   |   |   | $S_2$=0.825 |
| 2 | 1.59028 | 30.9 | $R_3$=Asphere | $T_2$=0.800 |
|   |   |   | $R_4$=Asphere |   |
|   |   |   |   | $S_3$=1.123 |
| 3 | 1.73400 | 51.0 | $R_5$= 9.4018 | $T_3$=2.697 |
|   |   |   | $R_6$=−9.4018 |   |

It was found during design of the various embodiments of the invention presented herein, that Example I appeared to represent the limit to which the relative aperture could be increased while maintaining the desired angular field coverage. Example II represents a lens with a reduced semi-field angle of 16.61° resulting in an increase in the focal length to 12.00mm and, more importantly, a relative aperture of 1.40 . As with Example I, the first and second elements have been made of polymethyl methacrylate and polystyrene with aspheres on each of the surfaces of the two elements. The respective aspheres are an ellipsoid, hyperboloid and two paraboloids, though the choice of these particular aspheres could be modified without sacrificing optical quality. Element 3 is again formed of a high index glass to provide a relatively flat field and is a symmetric element. Once again no higher order corrections have been made in the aspheric surfaces and the coefficients are as tabulated below for the four aspheres:

Table II

| Surf. 1 | Surf. 2 | Surf. 3 | Surf. 4 |
| --- | --- | --- | --- |
| C .15671005 | −.07073345 | −.08252031 | .23303578 |
| K −.81198436 | −20.27948769 | −1.0 | −1.0 |

EXAMPLE III

| Element | $N_D$ | V | Radius mm | Thickness or Separation mm |
| --- | --- | --- | --- | --- |
| 1 | 1.49168 | 57.4 | $R_1$=Asphere | $S_1$=1.800 |
|   |   |   | $R_2$=Asphere | $T_1$=4.553 |
|   |   |   |   | $S_2$=1.204 |
| 2 | 1.59028 | 30.9 | $R_3$=Asphere | $T_2$= .900 |
|   |   |   | $R_4$=Asphere |   |
|   |   |   |   | $S_3$=1.190 |
| 3 | 1.73400 | 51.0 | $R_5$= 10.134 | $T_3$=2.960 |
|   |   |   | $R_6$=−10.134 |   |

Example III is similar to Example II with a further reduction in semi-field angle to 14.34° and improved aberration correction at a relative aperture of $f/1.40$, with a focal length of 14.00mm. The coefficients for the aspheres of Example III are tabulated below:

Table III

| Surf. 1 | Surf. 2 | Surf. 3 | Surf. 4 |
| --- | --- | --- | --- |
| C .13140514 | −.06324239 | −.08182546 | .21013933 |
| K −.80160409 | −18.01533340 | −1.0 | −1.0 |

EXAMPLE IV

| Element | $N_D$ | V | Radius mm | Thickness or Separation mm |
| --- | --- | --- | --- | --- |
| 1 | 1.49168 | 57.4 | $R_1$=Asphere | $S_1$=1.800 |
|   |   |   | $R_2$=Asphere | $T_1$=3.517 |
|   |   |   |   | $S_2$= .825 |
| 2 | 1.59028 | 30.9 | $R_3$=−13.094 | $T_2$= .900 |
|   |   |   | $R_4$=Asphere |   |
|   |   |   |   | $S_3$=1.135 |
| 3 | 1.73400 | 51.0 | $R_5$= 9.5029 | $T_3$=2.716 |
|   |   |   | $R_6$= −9.5029 |   |

Attempts to further increase the relative aperture based upon the designs of Examples II and III resulted in the finding that the aspheric power on the surface 3 was not essential to obtain the desired optical quality. It was found that this aspheric power could be successfully transferred to strengthen the hyperboloid on surface 2 and that surface 3 could be made a simple spherical surface with no consequent loss of optical quality, thereby utilizing three aspheres rather than four. Example IV represents this design with a focal length of 12.01mm at a relative aperture of $f/1.40$ and a semi-field angle of 16.16°. In other respects, Example IV is similar to Examples I–III with polymethyl methacrylate and polystyrene utilized for Elements 1 and 2 and a high index glass utilized for Element III, which is symmetrical in design. The coefficients for the aspheres in Example IV are tabulated below:

| Surf. 1 | Surf. 2 | Surf. 4 |
| --- | --- | --- |
| C .15628953 | −.06431991 | .22992535 |
| K −.75823196 | −25.72410942 | −1.0 |

The invention has been described in detail with particular reference to preferred embodiments thereof, but it will be understood that variations and modifications can be effected within the spirit and scope of the invention.

I claim:

1. A three element objective lens comprising a front positive biconvex element having two aspheric surfaces, a middle negative biconcave element having two aspheric surfaces and a rear positive biconvex element wherein said aspheric surfaces are from front to rear, an ellipsoid, a hyperboloid, and two paraboloids.

2. A three element lens comprising a front positive biconvex element, a middle negative biconcave element and a rear positive biconvex element, said front element having two aspheric surfaces and said middle element having at least one aspheric surface wherein the lens focal length F, radii of curvature R, thicknesses T, air spaces S, vertex curvatures C and conic constants K, as numbered by subscript from front to rear, are as defined by the following relationships:

$$11 \leq F \leq 14$$
$$9 \leq R_5 \leq 11$$
$$9 \leq -R_6 \leq 11$$
$$3 \leq T_1 \leq 5$$
$$0.8 \leq T_2 \leq 0.9$$
$$2 \leq T_3 \leq 3$$
$$0.8 \leq S_2 \leq 1.5$$
$$0.9 \leq S_3 \leq 1.5$$
$$0.13 \leq C_1 \leq 0.16$$
$$0.06 \leq -C_2 \leq 0.08$$
$$0.08 \leq -C_3 \leq 0.09$$
$$0.21 \leq C_4 \leq 0.24$$
$$.75 \leq -K_1 \leq .85$$
$$17 \leq -K_2 \leq 26.$$

3. A lens as in claim 2, wherein said lens has a focal length of 11.75mm when constructed according to the following parameters:

| Element | $N_D$ | V | Radius mm | Thickness or Separation mm |
|---|---|---|---|---|
| | | | | $S_1=1.800$ |
| 1 | 1.49168 | 57.4 | $R_1$=Asphere | $T_1=3.500$ |
| | | | $R_2$=Asphere | $S_2=0.814$ |
| 2 | 1.59028 | 30.9 | $R_3$=Asphere | $T_2=0.900$ |
| | | | $R_4$=Asphere | $S_3=0.975$ |
| 3 | 1.73400 | 51.0 | $R_5=9.0058$ | $T_3=2.800$ |
| | | | $R_6=-9.0058$ | | wherein, from front to rear, the elements are numbered from 1 to 3, the corresponding indices of refraction, N, and Abbé numbers, V, are listed for each element, the radii of curvature of the surfaces are numbered from $R_1$ to $R_6$, the thicknesses $T_1$ to $T_3$, the spacings between the elements are numbered from $S_1$ to $S_3$, and wherein $R_1$, $R_2$, $R_3$ and $R_4$ represent the vertex radius of curvature of an aspheric surface defined by the following formula and parameters:

$$x = \frac{Cy^2}{1+ \sqrt{1-(1+K)C^2y^2}}$$

| | Surf. 1 | Surf. 2 | Surf. 3 | Surf. 4 |
|---|---|---|---|---|
| C | 0.15632779 | −0.07215136 | −0.08858961 | 0.23514772 |
| K | −0.84927155 | −17.36321211 | −1.0 | −1.0 | wherein x is the sag of an aspheric surface from a plane reference surface at a radial distance y from the axis of the lens, C is equal to the reciprocal of the vertex radius of curvature and K K is the conic constant.

4. A lens as in claim 2, wherein said lens has a focal length of 12.00mm when constructed according to the following parameters:

| Element | $N_D$ | V | Radius mm | Thickness or Separation mm |
|---|---|---|---|---|
| | | | | $S_1=1.800$ |
| 1 | 1.49168 | 57.4 | $R_1$=Asphere | $T_1=3.700$ |
| | | | $R_2$=Asphere | $S_2=0.825$ |
| 2 | 1.59028 | 30.9 | $R_3$=Asphere | $T_2=0.800$ |
| | | | $R_4$=Asphere | $S_3=1.123$ |
| 3 | 1.73400 | 51.0 | $R_5=9.4018$ | $T_3=2.697$ |
| | | | $R_6=-9.4018$ | | wherein, from front to rear, the elements are numbered from 1 to 3, the corresponding indices of refraction, N, and Abbé numbers, V, are listed for each element, the radii of curvature of the surfaces are numbered from $R_1$ to $R_6$, the thicknesses of the elements are numbered from $T_1$ to $T_3$, the spacings between the elements are numbered from $S_1$ to $S_3$, and wherein $R_1$, $R_2$, $R_3$ and $R_4$ represent the vertex radius of curvature of an aspheric surface defined by the following formula and parameters:

$$x = \frac{Cy^2}{1+ \sqrt{1-(1+K)C^2y^2}}$$

| | Surf. 1 | Surf. 2 | Surf. 3 | Surf. 4 |
|---|---|---|---|---|
| C | .15671005 | −.07073345 | −.08252031 | .23303578 |
| K | −.81198436 | −20.27948769 | −1.0 | −1.0 | wherein x is the sag of an aspheric surface from a plane reference surface at a radial distance y from the axis of the lens, C is equal to the reciprocal of the vertex radius of curvature and K is the conic constant.

5. A lens as in claim 2, wherein said lens has a focal length of 14.00 mm when constructed according to the following parameters:

| Element | $N_D$ | V | Radius mm | Thickness or Separation mm |
|---|---|---|---|---|
| | | | | $S_1=1.800$ |
| 1 | 1.49168 | 57.4 | $R_1$=Asphere | $T_1=4.553$ |
| | | | $R_2$=Asphere | $S_2=1.204$ |
| 2 | 1.59028 | 30.9 | $R_3$=Asphere | $T_2=.900$ |
| | | | $R_4$=Asphere | $S_3=1.190$ |
| 3 | 1.73400 | 51.0 | $R_5=10.134$ | $T_3=2.960$ |
| | | | $R_6=-10.134$ | | wherein, from front to rear, the elements are numbered from 1 to 3, the corresponding indices of refraction, N, and Abbé numbers, V, are listed for each element, the radii of curvature of the surfaces are numbered from $R_1$ to $R_6$, the thicknesses of the elements are numbered from $T_1$ to $T_3$, the spacings between the elements are numbered from $S_1$ to $S_3$, and wherein $R_1$, $R_2$, $R_3$ and $R_4$ represent the vertex radius of curvature of an aspheric surface defined by the following formula and parameters:

$$x = \frac{Cy^2}{1+\sqrt{1-(1+K)C^2y^2}}$$

| | Surf. 1 | Surf. 2 | Surf. 3 | Surf. 4 |
|---|---|---|---|---|
| C | .13140514 | −.06324239 | −.08182546 | .21013933 |
| K | −.80160409 | −18.01533340 | −1.0 | −1.0 | wherein $x$ is the sag of an aspheric surface from a plane reference surface at a radial distance $y$ from the axis of the lens, $C$ is equal to the reciprocal of the vertex radius of curvature and $K$ is the conic constant.

6. A lens as in claim 2, wherein said lens has a focal length of 12.01 mm when constructed according to the following parameters:

| Element | $N_D$ | V | Radius mm | Thickness or Separation mm |
|---|---|---|---|---|
| | | | | $S_1$=1.800 |
| | | | $R_1$=Asphere | |
| 1 | 1.49168 | 57.4 | | $T_1$=3.517 |
| | | | $R_2$=Asphere | |
| | | | | $S_2$= .825 |
| | | | $R_3$=−13.094 | |
| 2 | 1.59028 | 30.9 | | $T_2$= .900 |
| | | | $R_4$=Asphere | |
| | | | | $S_3$=1.135 |

-continued

| Element | $N_D$ | V | Radius mm | Thickness or Separation mm |
|---|---|---|---|---|
| 3 | 1.73400 | 51.0 | $R_5$= 9.5029 | $T_3$=2.716 |
| | | | $R_6$= −9.5029 | | wherein, from front to rear, the elements are numbered from 1 to 3, the corresponding indices of refraction, N, and Abbé numbers, V, are listed for each element, the radii of curvature of the surfaces are numbered from $R_1$ to $R_6$, the thicknesses of the elements are numbered from $T_1$ to $T_3$, the spacings between the elements are numbered from $S_1$ to $S_3$, and wherein $R_1$, $R_2$ and $R_4$ represent the vertex radius curvature of an aspheric surface defined by the following formula and parameters:

$$x = \frac{Cy^2}{1+\sqrt{1-(1+K)C^2y^2}}$$

| | Surf. 1 | Surf. 2 | Surf. 4 |
|---|---|---|---|
| C | .15628953 | −.06431991 | .22992535 |
| K | −.75823196 | −25.72410942 | −1.0 | wherein $x$ is the sag of an aspheric surface from a plane reference surface at a radial distance $y$ from the axis of the lens, $C$ is equal to the reciprocal of the vertex radius of curvature and $K$ is the conic constant.

* * * * *

UNITED STATES PATENT OFFICE
CERTIFICATE OF CORRECTION

Patent No. 3,944,337  Dated March 16, 1976

Inventor(s) Paul Lewis Ruben

It is certified that error appears in the above-identified patent and that said Letters Patent are hereby corrected as shown below:

Column 1, line 23, "lensens" should read -- lenses --.

Column 6, line 2, "KK" should read -- K --.

Column 7, line 9, "-08182546" should read -- -.08182546 --.

Column 7, line 24, "1,49168" should read -- 1.49168 --.

Signed and Sealed this

Twenty-seventh Day of July 1976

[SEAL]

Attest:

RUTH C. MASON
Attesting Officer

C. MARSHALL DANN
Commissioner of Patents and Trademarks